United States Patent [19]

Tamai

[11] Patent Number: 4,840,845

[45] Date of Patent: Jun. 20, 1989

[54] MAGNETIC RECORDING MEDIUM HAVING PERPENDICULAR MAGNETIC ANISOTROPY

[75] Inventor: Hideki Tamai, Tokyo, Japan

[73] Assignee: NEC Corporation, Japan

[21] Appl. No.: 58,040

[22] Filed: Jun. 4, 1987

[30] Foreign Application Priority Data

Jun. 6, 1986 [JP] Japan ................... 61-132551

[51] Int. Cl.[4] .............................................. G11B 5/64
[52] U.S. Cl. .................... 428/336; 427/132; 428/694; 428/900
[58] Field of Search ................ 148/304, 305; 420/34, 420/70, 104, 126; 428/654, 900, 336; 427/132

[56] References Cited

U.S. PATENT DOCUMENTS

| | | | |
|---|---|---|---|
| 3,853,700 | 12/1974 | Armijo | 420/126 |
| 4,020,236 | 4/1977 | Aonuma et al. | 428/694 |
| 4,063,000 | 12/1977 | Aonuma et al. | 428/900 |
| 4,325,733 | 4/1982 | Aboaf | 148/304 |
| 4,349,527 | 9/1982 | Amano et al. | 420/126 |
| 4,693,927 | 9/1987 | Nishikawa et al. | 428/694 |

FOREIGN PATENT DOCUMENTS 186123 10/1984 Japan .
57503 4/1985 Japan .
57511 4/1985 Japan .
193125 10/1985 Japan .

OTHER PUBLICATIONS

Tsutsumi et al., "Fe–Nd–Ti Films with Perpendicular Magnetic Anisotropy", Japanese Journal of Applied Physics, vol. 23, No. 3, Mar. 1984, pp. L169–L171.

Primary Examiner—Paul J. Thibodeau
Attorney, Agent, or Firm—Laff, Whitesel, Conte & Saret

[57] ABSTRACT

A magnetic recording medium having good perpendicular magnetic anisotropy is provided in which an alloy mainly consisting of Fe and Ti; or Fe, Ti and Cr; is fabricated on a substrate to have a structure of mixed phase comprising an amorphous phase and an isolated crystalline grains with bcc phase surrounded by the amorphous phase to have the perpendicular magnetic anisotropy, the atomic percents of Ti component in the Fe-Ti alloy being 15–21 and the atomic percents of Ti and Cr components in the Fe-Ti-Cr alloy being 5–21 and 5–15, respectively.

Thus, a good perpendicular magnetic recording medium suitable for massproduction can be provided at a lower cost by using relatively cheap Fe and Ti as main components.

15 Claims, 6 Drawing Sheets

MAGNETIC RECORDING MEDIUM HAVING PERPENDICULAR MAGNETIC ANISOTROPY

BACKGROUND OF THE INVENTION

1. Field of the invention

The present invention relates to a magnetic recording medium, for example, a magnetic tape, a magnetic disc, etc., and particularly to a magnetic recording medium having perpedicular magnetic anisotropy.

2. Description of the prior art

Recently in the field of magnetic recording medium, perpendicular magnetic recording system was proposed as a new system that would enable recording of exceedingly high density compared with the currently prevailing longtitudinal recording system and the researches and developments of such new system are now intensively proceeded.

In order to realize the perpendicular magnetic recording, a medium having an easy axis of magnetization in the direction perpendicular to the surface of the medium is required.

Up to this date, some magnetic films are known to have such magnetic property as above. They are, for example alloys produced by a sputtering method or a vacuum deposition method to have such combinations of the components as Co-Cr, Co-Ti, Co-V, Co-Mo, Co-W, Co-Mn or Co-Ru, as described in the Journal of Applied Magnetics Society of Japan, Vol. 8, No. 1 (1984), page 17.

For example, Co-Cr recording films with perpendicualar magnetic anisotropy are reported by S. Iwasaki, et al. in the IEEE Transacctions on Magnetics, Vol. MAG-14, No. 5 (1978), pages 849–851.

These known perpendicular magnetic mediums include Co as one of the main components, but the use of Co causes some problems about costs and the stability of supply.

There are some reports on perpedicular magnetic films including relatively cheap Fe as one of the main components in place of Co.

For example, $Fe_{1-x}Cr_x$ ($x=0.33-0.40$) films are reported by K. Saiki, et al. in the Journal of Applied Magnetics Society of Japan Vol. 9, No. 2 (1985), pages 61–64; $Fe_{1-x}Nd_x$ ($x=0.40-0.45$) films are reported by T. Suzuki in the Japanese Journal of Applied Physics, Vol. 24, No. 3 (1985), pages L199–202; and $Fe_{61.5}Nd_{34}Ti_{4.5}$ film is reported by K. Tsutsumi, et al. in the Japanese Journal of Applied Physics, Vol 23, No. 3 (1984), pages L169–L 171.

These Fe-containing films however still including large amounts of precious metals such as Cr or Nd and so their production costs are still high.

SUMMARY OF THE INVENTION

An object of the present invention therefore is to provide a new magnetic recording medium which has good perpendicular magnetic anisotropy but can be produced at a lower cost.

According to the present invention, the medium comprises a film of an alloy being composed essentially of Fe an Ti. Ti content of the alloy is 15–21 atomic percents, but this content may be broadened to 5–21, favorably 10–21 atomic percents on condition that 5–15 percents of Cr are contained together. It is essential that the compound either of Fe-Ti or Fe-Ti-Cr should have a structure of mixed phase comprising an isolated crystalline grains of a body centers cubic (bcc) structure and an amorphous phase.

The medium of the present invention may contain a trace amount, say less than 5 atomic percents, of at least one elements selected from the group consisting of Ta, Cr, Zr, W, Na, Hf, Mo, V, Cu, Nd, Mn, Bi, Si, Al, O, N, H and C. Naturally, Cr as a trace element is excluded in the case of Fe-Ti-Cr alloy.

The medium of the present invention may further comprises a film of a soft magnetic material to give a two-layer magnetic recording medium.

The medium of the present invention can be produced by any of the methods in themselves known to the art for fabricating a film of an alloy on a substrate. Such methods, for examples, are Rf magnetron sputtering method, a DC sputtering method, an ion-beam sputtering method, an electron-beam deposition method, a resistor-heating deposition method, a Molecular Beam Evaporation (MBE) method, a Chemical Vapor Deposition (CVD) method, a plating method, etc.

As for the substrate, any known substrates, for example, a glass plate and preferably an organic film such as the one made from a polyamide, a polyamide, a ployester series resin, etc. may be used.

Thus the medium of the present invention can be produced from Fe, which has an ample resource and is relatively cheap, and Ti, which has high corrosion resistivity and also is relatively cheap.

The present invention therefore can present a perpendicular magnetic recording medium which is suitable for mass production and can be produced at a lower cost, but notwithstanding has good magnetic properties.

DESCRIPTION OF THE PREFERRED EMBODIMENTS

EXAMPLE 1

Some embodiments of the perpendicular magnetic recording medium of the present invention constituted by a magnitic fil 1 of an Fe-Ti alloy fabricated on a substrate 2 will be explained with reference to the attached FIGS. 1–7.

In this example, the magnetic films of Fe-Ti alloy were produced by an RF magnetron sputtering method as shown hereinafter.

As for a sputtering target, pure Fe of 99.9 percents purity in 4 inches diameter was used. For preparing Fe-Ti alloys of various Ti contents, the necessary number of pure Ti chips of 99.9 percents purity in 8 mm × 8 mm size were placed on the pure Fe target radially with equal intervals to stand in the ring-like form.

The sputtering conditions to produce the magnetic films of Fe-Ti alloy were evcuated vaccum pressure Pi of less than $7.0 \times 10^{-7}$ Torr; sputtering power Pw of 300 W; argon gas pressure Par of $5 \times 10^{-3}$ Torr; substrate temperature ts of room temperature (under water cooling of the substrate holder); sputtering time required for obtaining a film of 0.8 micron thickness on a 10 mm × 10 mm size glass substate of 200 microns thickness, in this example, 10 minutes.

In order to evaluate the magnetic films of Fe-Ti alloy as produced, a vibrating sample magnetometer (hereinafter abbreviated as VSM) was used for the evaluation of the magnetic properties of the films; an electron probe microanalyzer (hereinafter abbreviated as EPMA) was used for the Fe-Ti composition analysis. An X-ray diffraction analyzer (XRD) and a transmission electron microscope (TEM) were used for investigating crystalline structures and crystalline microstructures; respectively.

Figure 1:
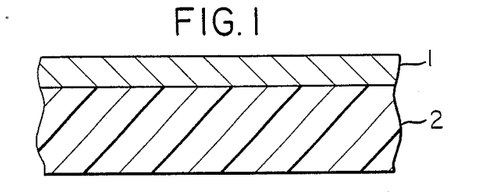
FIG. 1. is a sectional view showing a structure of a magnetic recording medium according to an enbodiment of the present invention.
Figure 2:
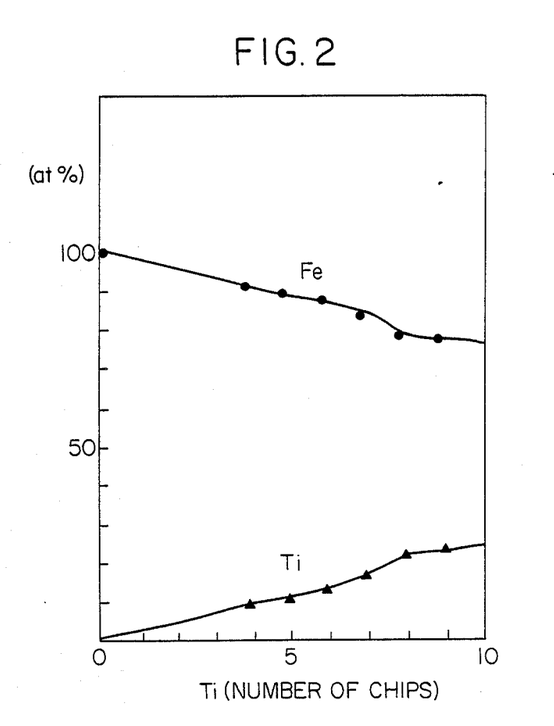
FIG. 2 shows variations of atomic percents of Fe and Ti in accordance whith the number of Ti chips placed on the pure Fe target in RF magnetron sputtering.

FIG. 2 shows the results of the composition analyses by EPMA of the magnetic films of Fe-Ti alloys produced by using various numbers of the Ti chips placed on the pure Fe target. The results are shown by the atomic percents of Fe an Ti for the total number of atoms existent.

Figure 3:
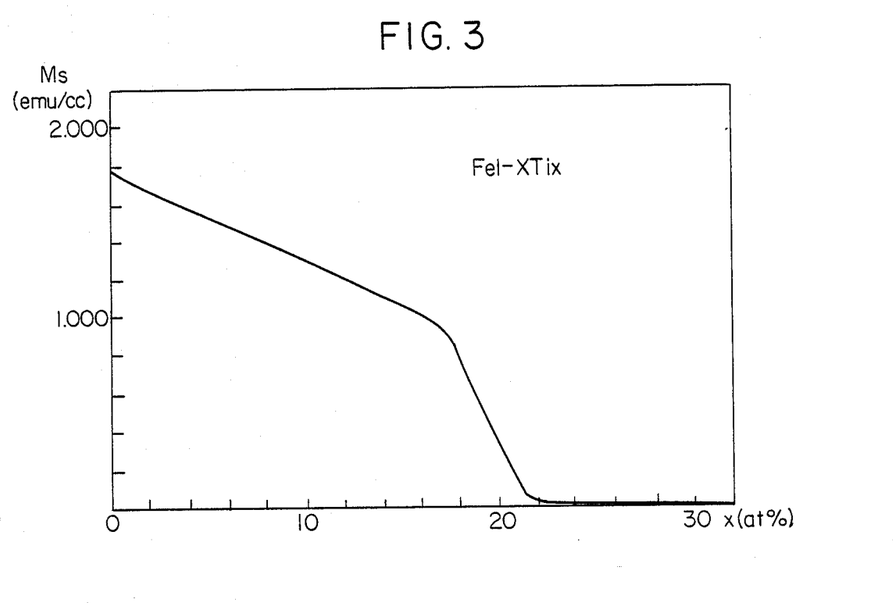
FIG. 3 and FIG. 4 show relations between saturation magnetization Ms and Ti content and between perpendicular anisotropy magnetic fiel Hk and Ti content, respectively, for the various Ti contents in Fe-Ti alloys.
Figure 4:
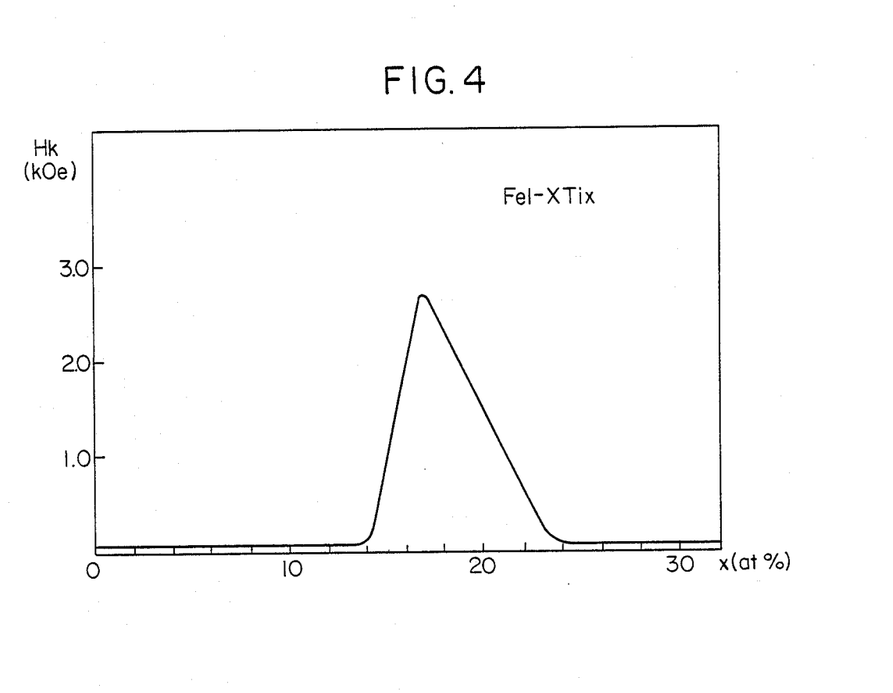

Magnetic properties of the Fe-Ti films will be explained with reference to FIGS. 3 and 4 in which the magnetic properties for these films were measured by the VSM at room termperature. Saturation magnetization Ms and perpendicular anisotropy magnetic field HK relative to the Ti content are shown in FIGS. 3 and 4, respectively. The HK values were determined by in-plane M-H curves. As shown in FIG. 3, the saturation magnetization Ms is more than 0 when the Ti content is less than 21 atomic percents. The perpendicular anisotropy magnetic field HK has large value of more than 1 kOe, whic is sufficient for the perpendicular magnetic recording, when the Ti content is in a range from 15 to 21 atomic percents as shown in FIG. 4. Therefore, the Ti content is favorable in the range from 15 to 21 atomic percents.

Figure 5:
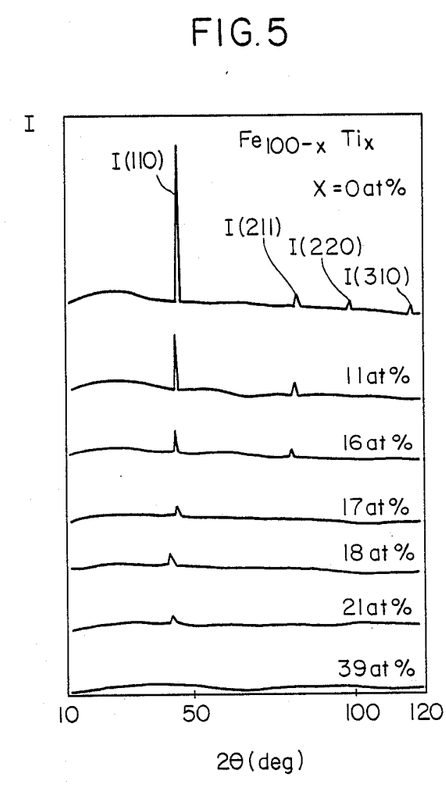
FIG. 5 shows X-ray diffraction patterns of Fe-Ti magnetic films variable in accordance with the Ti content.
Figure 6:
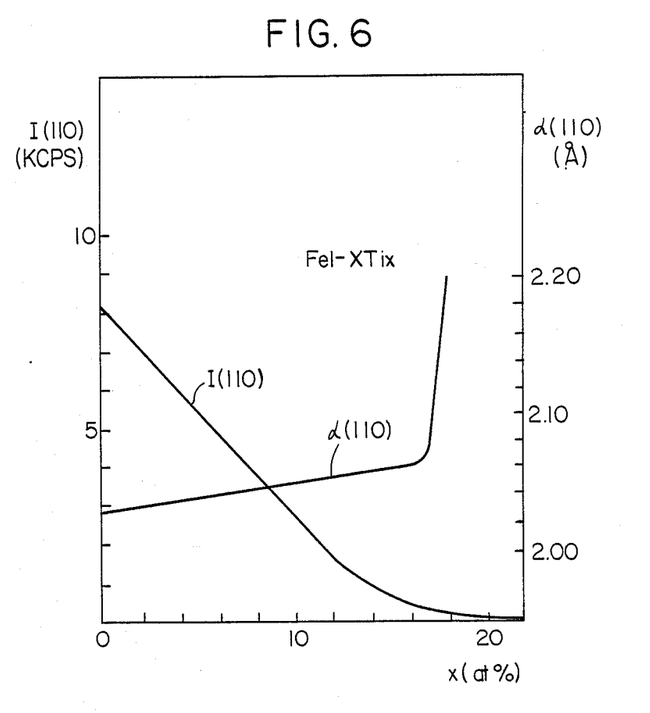
FIG. 6 ilustrates relation between X-ray diffraction intensity I(110) of (110) plane, lattice spacing d(110) of (110) plane and Ti content in the Fe-Ti magnetic film.

Next, crystalline structures for the Fe-Ti films will be explained with reference to FIGS. 5 and 6. FIG. 5 shows X-ray diffraction patterns obtained from these films in various Ti contents. Diffraction peaks I(110), I(211), I(220) and I(310) correspond to (110), (211), (220) and (310) planes for alpha-Fe(bcc) type phase. Since the intensity I(110) was strongest, the (110) plane is a preferred oriented plane. FIG. 6 shows the relations between diffraction peak intensity I(110), and lattice spacing d(110) of the (110) plane and Ti content.

When the Ti content is less than 15 atomic percents, the intensity I(110) monotonically decreases with an increase in Ti content. On the other hand, the lattice spacing d(110) monotonically increases as shown in Fig. 6. The diffraction peak I(110) takes high value as shown in FIG. 5. Therefore, the Fe-Ti film structure including less than 15 atomic percents Ti is polycrystalline bcc phase.

When the Ti content is more than 21 atomic percents, no X-ray diffraction was observed as shown in FIG. 5. Furhter, by the TEM observation, diffraction patterns formed a hole and no grains were observed. Therefore, the Fe-Ti film structure including more than 21 atomic percents Ti is amorphous phase.

When the Ti content is in a range from 15 to 21 atomic percents, intensity I(110) takes very low value and the lattice spacing d(110) steeply increases for more than 17 atomic percents Ti as shown in FIG. 6. The diffraction peak I(110) takes low value as shown in FIG. 5. Therefore, the Fe-Ti film structure including in a range from 15 to 21 atomic percents Ti is in a transition state from polycrystalline bcc to amorphous phase. Further, by the TEM observation, the Fe-Ti film microstructures were composed of amorphous phase and isolated crystalline grains with bcc phase surrounded by the amorphous phase.

Figure 7:
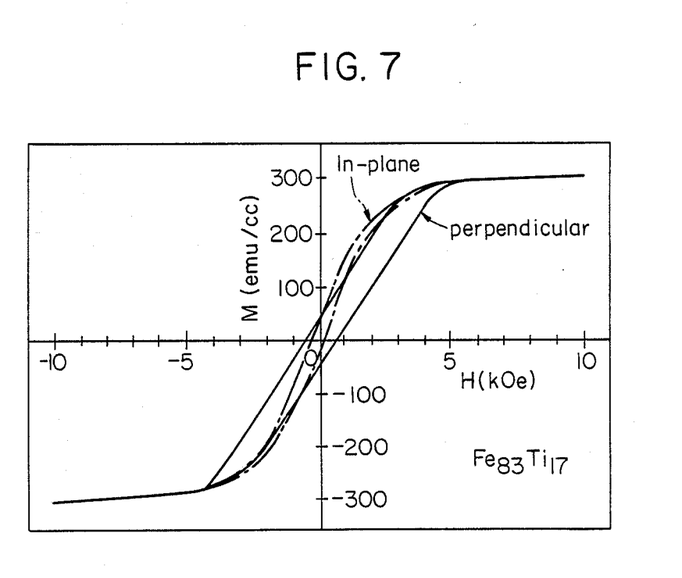
FIG. 7 illustrates magnetic properties of the $Fe_{83}Ti_{17}$ perpendicular maagnetic film of the present invention by way of M-H curves.

FIG. 7 illustrates M-H curves obtained by VSM measurement through magnetization either in the in-plane or perpendicular magnetic field, as to one of the examples of Fe-Ti alloys having the perpendicular magnetic anisotropy prepared under the suitable sputtering conditions, i.e., sputtering power pw of 300 W, and argon gas pressure Par of $5 \times 10^{-3}$ Torr, and by the use of the seven pieces of Ti chips. FIG. 7 shows that a perpendicular magnetic film with verey good magnetic properties for use as a perpendicular magnetic film, i.e., saturation magnetization Ms of 300 emu/cc, perpendicular anisotropy magnetic field Hk of 2.7 kOe, perpendicular coercive force $Hc_R$ of 710 Oe, and in-plane coercive force $Hc_L$ of 160 Oe.

The EPMA analysis of this magnetic film showed that it has a composition of 83 atomic percents of Fe and 17 atomic percents of Ti.

As described above, the magnetic film of Fe-Ti alloy having the Ti content of 15–21 atomic percents was found to have good magnetic properties for use as a perpendicular magnetic film. In fact, such magnetic film, when fabricated on a substrate made of a film of polyimide resin, gave a perpendicular magnetic recording medium having excellent recording and reproducing properties. Further, such medium can be produced at a relatively low cost and by a mass production system.

In this example, RF magnetron sputtering method was employed to produce the magnetic film of the Fe-Ti alloy, but any other known film-forming methods as above described may be employed.

Further, in place of the combination target comprising the pure Fe base and the pure Ti chips as used, it is possible to use an alloy target comprising an alloy of Fe and Ti having the corresponding Ti content.

EXAMPLE 2

Figure 8:
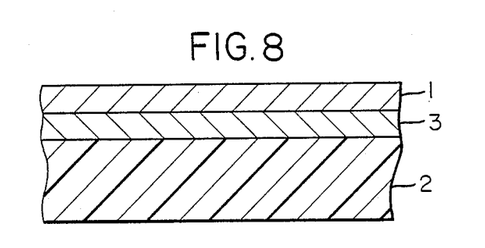
FIG. 8 is a sectional view showing a structure of a magnetic recording medium according to another embodiment of the present invention.

In this example, an explanation is made on an embodiment of a perpendicular magnetic recording two-layer medium as shown in FIG. 8 comprising a soft magnetic film 3 and a perpendicular magnetic film 1 of an Fe-Ti alloy fabricated on a substate 2. The magnetic properties can further be improved by the soft magnetic film 3.

On the substrate of the polymide film same as the one used in the Example 1, a magnetic film 3 of Ni-Fe alloy was fabricated by the RF magnetron sputtering method to have a thickness of 0.5 micron, as a soft magnetic film. Next, a magnetic film of Fe-Ti alloy containing 83 atomic percents of Fe and 17 atomic percents of Ti, that is $Fe_{83}Ti_{17}$ was fabricated thereon by the RF magnetron sputtering method to have a thickness of 0.3 micron, as a perpendicular magnetic film.

The two-layer magnetic recording medium thus prepared had magnetic properties comparable to those of the two-layer recording mediums comprising Ni-Fe alloy and Co-Cr alloy recently intensively researched and developed in this field of the invention.

In this example, the perpendicular magnetic film of Fe-Ti alloy was prepared to have the above composition $Fe_{83}Ti_{17}$, but any other suitable compositions as described in the Example 1 may be employed. Further, in place of the RF magnetron sputtering method, the other film forming methods as described above may be employed. Also, the target for the sputtering may either be the combined target or the alloy target.

As for the solft magnetic film, the magnetic film of Ni-Fe alloy was used in this Example, but any other soft magnetic films, such as those of sendust or Ni-Fe-Mo alloys may be used.

EXAMPLE 3

Some embodiments of the perpendicular magnetic recording medium of the present invention constituted by a magnetic film 1 of an Fe-Ti-Cr alloy fabricated on a substrate 2 will be explained with reference to the attached FIGS. 1 and 8-12.

In this example, the magnetic films of Fe-Ti-Cr alloy were produced by the RF magnetron sputtering method as shown hereinafter.

As for a sputtering target, pure Fe of 99.9 percents purity in 4 inches diameter was used. On the target, six pure Ti chips of 99.9 percents purity in 8 mm×8 mm size were placed radially with equal intervals to stand in the ring-like form. For preparing Fe-Ti-Cr alloys of the desired compositions, the suitable number of pure Cr chips of 99.9 percents purity in 5 mm×5 mm size also were placed thereon similarly in the ring-like form.

After evacuation to the vacuum pressure Pi of less than $7.0 \times 10^{-7}$ Torr, the sputtering was performed under the conditions of sputtering power Pw of 300 W; argon gas pressure Par of $5 \times 10^{-3}$ Torr; substrate temperature ts of room temperature (under water cooling of the substrate holder); to obtain a film of about 0.8 micron thickness on a 10 mm×10 mm size glass substrate of about 200 microns thickness.

In order to evaluate the magnetic films of Fe-Ti-Cr alloy as produced, the VSM, EPMA, XRD and TEM were used as in the Example 1.

Figure 9:
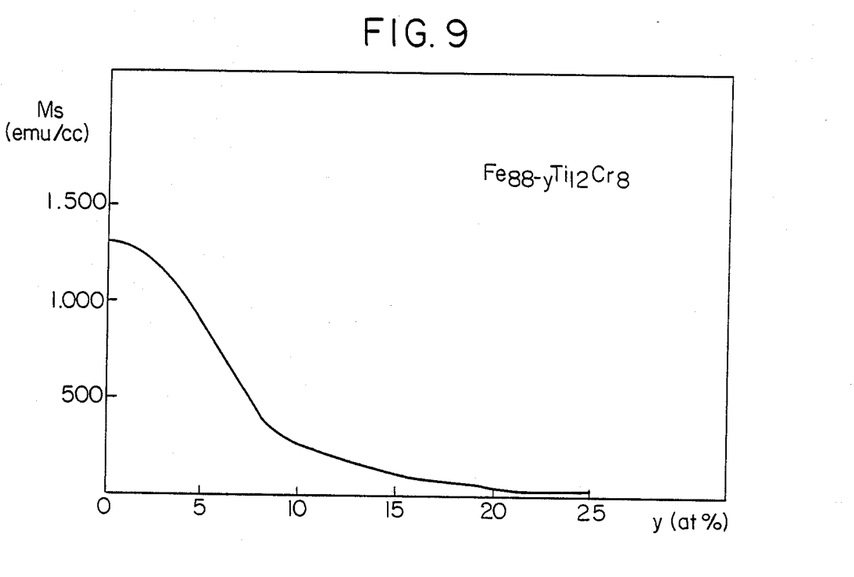
FIG. 9 and FIG. 10 show relations between saturation magnetization Ms and Cr content and between perpendicular anisotropy magnetic field HK and Cr content in Fe-Ti-Cr alloys having afixed Ti content of 12 atomic percents.

FIG. 9 shows the variation of saturation magnetization Ms determined by the VSM measurement as to the magnetic films of Fe-Ti-Cr alloys containing the fixed Ti content of 12 atomic percents and the various Fe and Cr contens.

Figure 10:
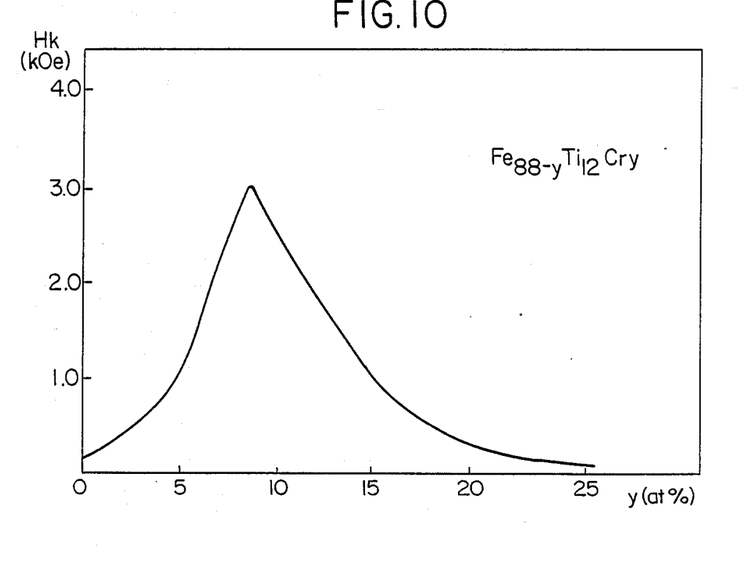

FIG. 10 shows the relation between the perpendicular anisotropy magnetic field Hk similarly determined by VSM and the Cr content of the above mentioned films. According to FIG. 9, Fe-Ti-Cr film having the perpendicular anisotropy Hk more than 1 KOe can be obtained in the range of Cr content between 5-15 atomic percents.

Figure 11:
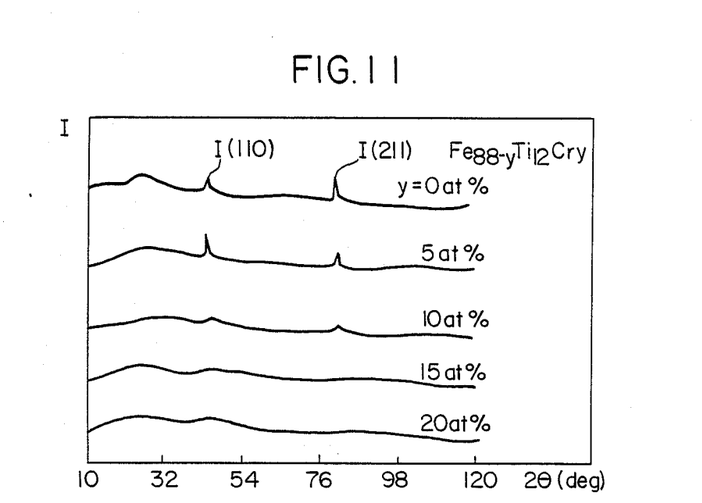
FIG. 11 illustrates X-ray diffraction patterns of Fe-Ti-Cr films having various Cr contents of 0–20 atomic percents and a fixed Ti content of 12 percents.

FIG. 11 shows X-ray diffraction patterns for Fe-Ti-Cr films containing the constant Ti content of 12 atomic percents in various Cr contents. Diffraction peaks I(110) and I(211) correspond to (110) and (211) planes for alpha-Fe(bcc) type phase. The intensity I(110) of the (110) plane for Fe-Ti-Cr films including Cr content in the range from 5 to 15 atomic percents is as weak as the intensity I(110) for Fe-Ti films including Ti content from 15 to 21 atomic percents (Example 1). Further, according to TEM observation, the crystalline microstructure of these films was composed of the amorphous phase and the isolated crystalline grains with bcc phase surrounded by the amorphus phase.

Figure 12:
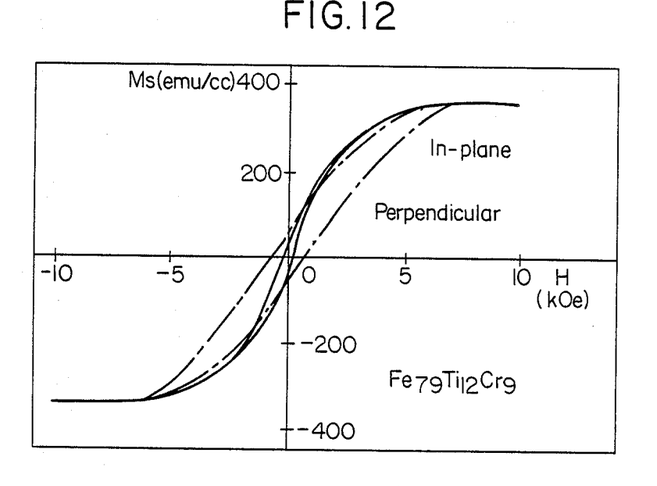
FIG. 12 illustrates M-H magnetization curves of the $Fe_{79}Ti_{12}Cr_9$ perpendicular magnetic film of the present invention.

FIG. 12 illustrates magnetization curves obtained by VSM meaurement of one of the examples of Fe-Ti-Cr alloys as prepared to have the most suitable Ti an Cr contents as a perpendicular magnetic film under the most suitable sputtering conditions, i.e., sputtering power Pw of 300 W, and argon gas pressure Par of $5 \times 10^{-3}$ Torrs. FIG. 7 shows that a perpendicular magnetic film with good magnetic properties for use as a perpendicular magnetic film i.e., saturation magnetization Ms of 340 emu/cc, perpendicular anisotropy magnetic field Hk of 3.0 KOe, perpendicular coercive force $Hc_R$ of 830 Oe and in-plane coercive force $Hc_L$ of 240 Oe.

The EPMA analysis of this magnetic film showed that it has a composition of 71 atomic percents of Fe, 12 atomic percents of Ti and 9 atomic percents of Cr. According to X-ray diffraction patterns and the TEM observation, the crystalline microstructure of this film has the mixture of the amorphous phase and the isolated crystalline grains with the bcc structure surrounded by the amorphous phase.

As described above, the magnetic film of Fe-Ti-Cr alloy having the Ti content of 12 atomic percents and the Cr content of 5-15 atomic percents was found to have good magnetic porperties for use as a perpendicular magnetic film. In fact, such magnetic film, when fabricated on a substrated made of a film of polymide resin, gave a perpendicular magnetic recording medium having excellent recording and reproducing properties. Further, such medium can be produced at a relatively low cost and by a mass productin syustem.

In this example, RF magnetron sputtering method was employed to produce the magnetic film of the Fe-Ti-Cr alloy, but any other film-forming methods as above described may be employed.

Further, in place of the combination target comprising the pure Fe base and the pure Ti and the pure Cr chips as used, it is possible to use an alloy target comprising an alloy of Fe, Ti and Cr having the corresponding composition.

In this example, the composition was fixed as to Ti content to 12 atomic percents, but the Ti content may vary within the range of 5-21 atomic percents, since the magnetic film has the mixed structure having the amorphous phase and the crystalline grain with the bcc phase.

EXAMPLE 4

In this example, an explanation is made on an embodiment of a perpendicular magnetic recording two-layer medium comprising a soft magnetic film a perpendicular magnetic film of an Fe-Ti-Cr alloy fabricated on a substrate.

On the substrate of the polyimide film same as the one used in the Example 3, a magnetic film on Ni-Fe alloy was fabricated by the RF magnetron sputtering method to have a thickness of 0.5 micron, as a soft magnetic film. Next, a magnetic film of Fe-Ti-Cr alloy containing 79 atomic percents of Fe, 12 atomic percents of Ti and 9 atomic percents of Cr, that is, $Fe_{79}Ti_{12}Cr_9$ was fabricated thereon by the RF magnetron sputtering method to have a thickness of 0.3 micron, as a perpendicular magnetic film.

The two-layer magnetic recording medium thus prepared showed magnetic properties and recording reproducing properties comparable to those of the two-layer recording mediums comprising Ni-Fe alloy and Co-Cr alloy recently intensively researched and developed in this field of the invention.

In this example, the perpendicular magnetic film of Fe-Ti-Cr alloy was prepared to have the above composition $Fe_{79}Ti_{12}Cr_9$, but any other suitable compositions as described in the Example 3 may be employed. Further, in place of the RF magnetron sputtering method, the other film forming methods as described above may be employed. Also, the target for the sputtering may either be the combined target or the alloy target.

As for the soft magnetic film, the magnetic film of Ni-Fe alloy was used in this Example, but any other soft magnetic films, such as those of sendust or Ni-Fe-Mo alloys may be used.

EXAMPLE 5

Some embodiments of the perpendicular magnetic recording medium of the present invention constituted by a magnetic film of an alloy consisting mainly of Fe and Ti, or Fe, Ti and Cr and also of a trace amount of other element or elements fabricated on a substrate will be explained.

In this example, the magnetic films of Fe-Ti or Fe-Ti-Cr alloy were produced by the RF magnetron sputtering method similarly to the above Examples 1 and 3, but a trace amount of other element or elements was or were introduced in the alloy.

For example, in order to introduce oxygen into the alloy, the atmosphere for the sputtering was prepared from argon gas and oxygen gas in the volume ratio of 10:1. As for the sputtering target, the combination target as used in the Example 1 to obtain the $Fe_{83}Ti_{17}$ alloy was used.

Through VSM measurement, it was found that the magnetic film of Fe-Ti alloy further containing a trace amount of oxygen produced as above has the perpendicular anisotropy magnetic field Hk of not less than 3 KOe, thus the better magnetic properties than the $Fe_{83}Ti_{17}$ alloy of the Example 1 as a perpendicular magnetic film.

Similar good results were obtained also by introducing nitrogen, hydrogen or carbon in place of oxygen.

The Ti content of 17 atomic percents of the Fe-Tu alloy may be varied within the range found suitable in the above Example 1 and the compositions of the Fe-Ti-Cr alloy as found suitable in the above Example 3 may also be employed.

The volume ratio 10:1 of argon to oxigen used above may also be varied within the range that the improvement of the magnetic properties can be achieved.

Although the element O, N, H or C was introduced into the alloy by the use of the sputtering atmosphere including such element in the gaseous state in the above embodiment, it is possible to introduce such element by the use of the sputtering target including such element, for example, the target made of iron oxide such as $Fe_2O_3$, etc. or iron nitride such as $Fe_3N$, etc.

Similarly to the above, it was also possible to introduce a trace amount of other elements such as Ta, Cr, Zr, W, Nb, Hf, Mo, V, Cu, Nd, Mn, Bi, Si or Al into the alloy to obtain improved magnetic properties of the Fe-Ti-alloy of the above Example 1 or the Fe-Ti-Cr alloy of the above Example 3 (excepting Cr for the Fe-Ti-Cr alloy). The introduction into the alloy of these elements could be made by using either combination ore alloy sputtering targets including such elements.

So long as the improvement can be achieved, two or more of the above trace elements may be introduced into the alloy of Fe-Ti or Fe-Ti-Cr.

The film forming methods other than the RF magnetron sputtering method as above employed may be used as in the aforementioned Examples 1-4.

EXAMPLE 6

In this example, an explanation is made on an embodiment of a perpendicular magnetic recording two-layer medium comprising a soft magnetic film and a perpendicular magnetic film of an alloy consisting mainly from Fe and Ti or Fe, ti and Cr, but containing further a trace amount of other element or elements as described in the above Example 5, on a substrate.

On the substrate of the organic film same as the one used in the above Examples 1-5, a soft magnetic film of Ni-Fe alloy was fabricated as in the above Examples 2 and 4. Then the perpendicular magnetic film of Fe-Ti alloy or Fe-Ti-Cr alloy containing a trace amount of other element or elements was fabricated thereon by means of the method and the materials as described in the above Example 5.

The thus prepared perpendicular magnetic recording two-layer medium showed similarly good magnetic properties.

Various materials, methods and apparatuses as mentioned in the above Examples 1-5 may be used also in this Example, for the production of the soft mangnetic film or the perpendicular magnetic film.

As clearly shown in the above description, the present invention provides a perpendicular magnetic recording medium, either in mono-layer form or two-layer form, comprising a film of an Fe-Ti alloy or Fe-Ti-Cr alloy. Since the main components of the alloy are Fe and Ti, the production cost can be made lower than that of the known Co-series alloys or Fe-precious metals series alloys. By the addition only of a trace amount of other elements to the Fe-Ti or Fe-Ti-Cr alloy, an improvement of the magnetic properties may be achieved.

I claim:

1. A magnetic recording medium having at least a first recording layer which is a source of perpendicular magnetic anisotropy and which comprises a magnetic film of an Fe-Ti or Fe-Ti-Cr alloy fabricated on a substrate, said alloy comprising:
   (a) 15-21 atomic percent of Ti and the balance of Fe, or
   (b) 5-21 atomic percent of Ti, 5-15 atomic percent of Cr and the balance of Fe,
to have a structure of mixed phase comprising an amorphous phase and isolated crystalline grains with bcc phase surrounded by said amorphous phase.

2. A magnetic recording medium according to claim 1, wherein the alloy further containing a trace amount of at least one elements selected from the group consisting of Ta, Cr, Zr, W, Na, Hf, Mo, V, Cu, Nd, Mn, Bi, Si, Al, O, N, H and C.

3. A magnetic recording medium according to claim 1 or 2, which further comprises a film of an Ni-Fe alloy, sendust, or Ni-Fe-Mo alloy to give a two-layer magnetic recording medium.

4. A magnetic recording medium having a first recording layer which is a source of perpendicular magnetic anisotropy, and which comprises a magnetic film formed of an Fe-Ti or Fe-Ti-Cr alloy which is fabricated on a substrate, said alloy comprising:
    (a) 15–21 atomic percent of Ti and the balance of Fe, or
    (b) 5–21 atomic percent of Ti, 5–15 atomic percent of Cr and the balance of Fe, said alloy having a structure of a mixed phase comprising an amorphous phase and isolated crystalline grains with a bcc phase surrounded by said amorphous phase, and
    a second magnetic recording layer which is comprised of a magnetic film formed from a group consisting of an Ni-Fe alloy, sendust, or an Ni-Fe-Mo alloy.

5. The magnetic recording medium of claim 1 or 4 wherein
    said Fe-Ti or Fe-Ti-Cr alloy is formed by a use of an RF magnetron sputtering method.

6. The magnetic recording medium of claim 1 or 4 wherein the perpendicular anisotropy magnetic field of said Fe-Ti or Fe-Ti-Cr alloy has more tha 1 KOe.

7. The magnetic recording medium of claim 1 or 4 wherein said first recording layer has the thickness of about 0.8 microns.

8. The magnetic recording medium of claim 1 or 4 wherein said substrate is a polyamide film.

9. The magnetic recording medium of claims 1 or 4 wherein said substrate is a glass plate.

10. The recording medium of claim 4 wherein said Ni-Fe alloy is formed by using an RF magnetron sputtering method, and
    said second layer taken from the group consisting of Ni-Fe alloy, sendust or Ni-Fe-Mo alloy has a thickness of about 0.5 microns.

11. The recording medium of claim 3 wherein said Ni-Fe alloys is formed by using an RF magnetron sputtering method, and
    said second layer taken from the group consisting of Ni-Fe alloy, sendust or Ni-Fe-Mo alloy has a thickness of about 0.5 microns.

12. The magneting recording medium of claim 3 wherein said Ni-Fe alloy is formed by using an RF magnetron sputtering.

13. The magnetic recording medium of calim 4 wherein said Ni-Fe alloy is formed by using an RF magnetron sputtering.

14. The magnetic recording medium of claim 3 wherein said second layer taken from the group consisting of Ni-Fe alloy, sendust, or Ni-Fe-Mo alloy has a thickness of about 0.5 microns.

15. The magnetic recording medium of claim 4 wherein said second layer taken from the group consisting of Ni-Fe alloy, sendust, or Ni-Fe-Mo alloy has a thickness of about 0.5 microns.

* * * * *